United States Patent

[11] 3,632,264

[72] Inventor Alvin E. Butcher
 Bartlesville, Okla.
[21] Appl. No. 880,342
[22] Filed Nov. 26, 1969
[45] Patented Jan. 4, 1972
[73] Assignee Phillips Petroleum Company

[54] NECK-FORMING COLLET HAVING ALTERNATE INVERTED WEDGE-SHAPED JAWS
 8 Claims, 6 Drawing Figs.
[52] U.S. Cl..................................................... 425/326,
 425/387, 425/415, 425/423, 425/414
[51] Int. Cl......................................................... B29d 23/03
[50] Field of Search............................................. 18/5 BM, 5
 BB, 5 BZ, 5 BR, 5 BT, 34 R, 2 RS, DIG. 5; 249/59,
 162, 163, 165; 29/421; 264/313

[56] References Cited
UNITED STATES PATENTS
3,079,633 3/1963 Fitz............................... 18/DIG. 5
3,247,548 4/1966 Fields et al.................... 18/2 RS X
Primary Examiner—J. Spencer Overholser
Assistant Examiner—Norman E. Lehrer
Attorney—Young and Quigg ABSTRACT: Apparatus for forming the thread and/or neck area at one end of a tubular parison comprises a collet having alternate jaws which are flared at the inward extension thereof and corresponding jaws which flare in a direction away from the center. The jaws which flare in a direction toward the center are biased outwardly and the other jaws are biased inwardly so that as the collet closes on a parison, no cracks are present between adjacent jaws.

INVENTOR.
A. E. BUTCHER

BY

*Young + Quigg*

ATTORNEYS

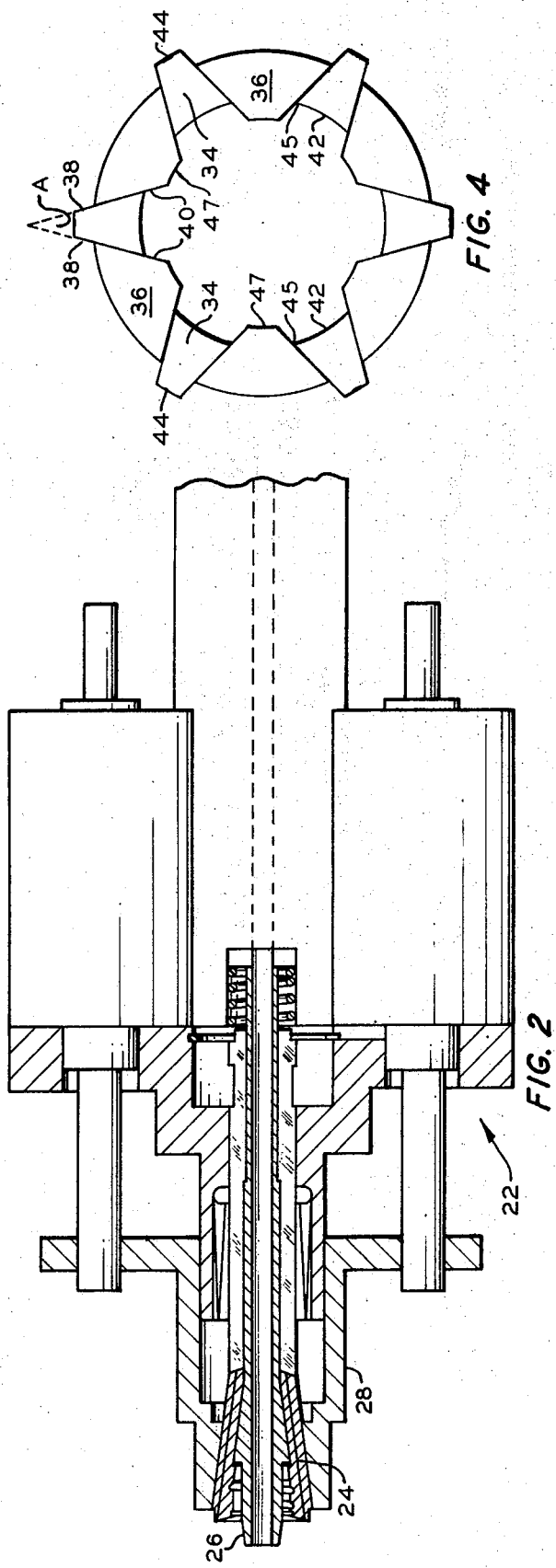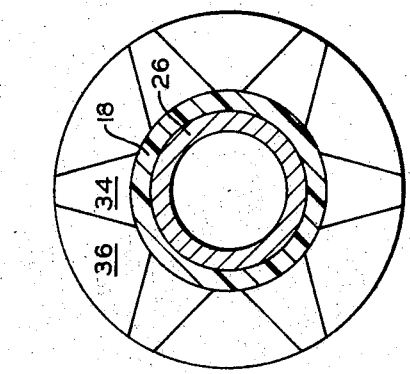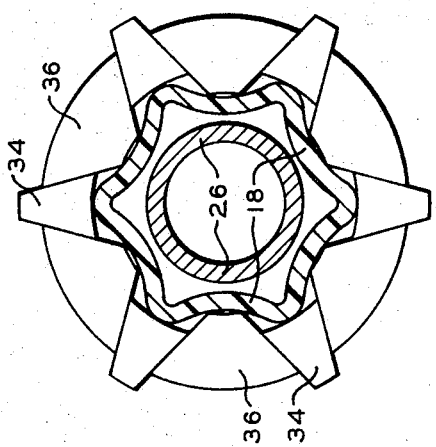

NECK-FORMING COLLET HAVING ALTERNATE INVERTED WEDGE-SHAPED JAWS

BACKGROUND OF THE INVENTION

This invention relates to an apparatus for forming the neck and/or thread area of a parison preform.

Hollow articles have traditionally been made through blow-molding techniques by extruding a molten parison from an annular die orifice and thereafter closing mold parts about the freshly extruded parison which is then expanded by internal fluid pressure to conform to the mold walls. Because of the molten nature of the parison, considerable leeway is provided for forming the neck finish, and by programmed parison extrusion and the like, for forming large and/or irregularly shaped objects.

Recent developments in the blow molding field have included a technique for forming parison preforms which are reheated to orientation temperature and biaxially oriented to give high strength, surprisingly clear articles. Such techniques are broadly disclosed in Turner et al. U.S. Pat. No. 3,390,426, and Wiley, U.S. Pat. No. 3,288,317, for instance. With this technique, however, there are certain problems inherent in dealing with a parison at the temperature necessary to effect orientation. Particularly in regard to molding bottles having configurations which are relatively common in bottles made by the older processes, for instance, bottles having a relatively small neck, there is the inherent difficulty that with a parison preform sufficiently small to form a neck of the proper size, there may be insufficient material in the bulk of the parison to provide adequate wall thickness in the resulting article. Since the most economical method of forming parison performs is to simply extrude a continuous length of tubing and later cut it into individual work pieces or parisons, it is preferable not to attempt to solve these difficulties by injection molding a parison preform having a reduced size in the neck-forming area, since this would add to the expense. Further, any technique which is to be utilized must avoid the formation of flash in the thread area, since one of the advantages of operating with parison preforms is that the resulting article direct from the mold requires no postforming or trimming operations.

SUMMARY OF THE INVENTION

It is an object of this invention to allow blowing a large bottle or the like having a small neck from a parison preform at orientation temperature;

It is a further object of this invention to economically produce parisons having reduced diameter in the thread-forming area;

It is a further object of this invention to avoid flash in the neck area of bottles made from parison preforms; and It is still a further object of this invention to provide apparatus for compression forming an open end of a parison preform at orientation temperature.

In accordance with this invention, a collet having alternate jaws which flare at the inward extension thereof and which are biased radially outward is closed about a parison preform to compression form same into a thread and/or neck area having reduced diameter.

BRIEF DESCRIPTION OF THE DRAWINGS

In the drawings, forming a part hereof, wherein like reference characters denote like parts in the various views.

FIG. 2 is a detailed view partially in section of the thread-forming head;

FIG. 4 is a schematic representation of the end of a thread-forming collet in accordance with the instant invention;

FIG. 5 is a cross-sectional view showing the first stage of the collet closing on a parison; and FIG. 6 is a cross-sectional view similar to FIG. 5 at a later stage in the operation.

DESCRIPTION OF THE PREFERRED EMBODIMENTS

Figure 1:
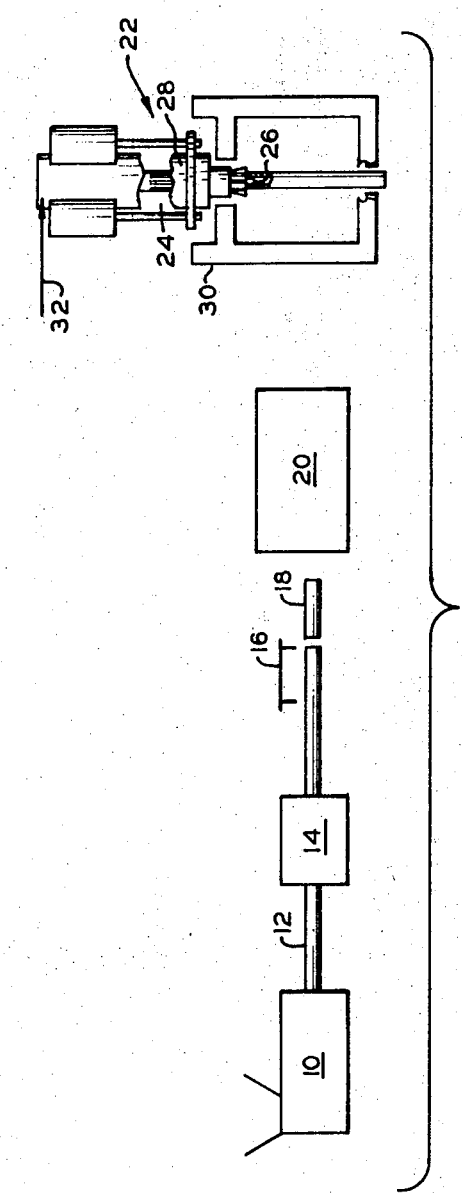
FIG. 1 is a schematic representation of apparatus utilizing the thread-forming collet of the instant invention.

This invention is applicable to the formation of any biaxially oriented article having a relatively small neck and/or thread area compared with the body portion of said article.

The invention is applicable for the production of these articles from any orientable thermoplastic resin. Exemplary resins include polyolefins, poly(vinyl chloride), acrylonitrile-butadiene-styrene and other styrene/butadiene-containing copolymers, polyamides, polyvinylidene chloride polymers and copolymers, polystyrene, and the like. Preferred resins include crystalline polymers such as polymers of at least one mono-1-olefin having two to eight carbon atoms per molecule, more preferably polymers and copolymers of ethylene, propylene, and 1-butene, with polypropylene being especially preferred.

The thermoplastic is freshly extruded or molded into parison preforms and cooled to solidify same. The parisons are then heated to orientation temperature, which in the case of olefin polymers, is generally about 1–50° F., preferably 5–25° F., below the crystalline melting temperature. The crystalline melting temperature can be determined by placing a small sample of the material to be tested on a heating stage of a polarizing microscope and recording the crystalline melting point as that temperature at which at last birefringence disappears on slow heating. For amorphous materials, the orientation temperature is that temperature well below the point where the polymer is visible molten. For instance, with PVC, a temperature of 220° to 250° F. is satisfactory although temperatures up to 340° F. can be used. The parison preforms can be heated to this orientation temperature in an air oven, in a liquid bath, in a heating block, or by subjecting them to radiant heat or any other suitable means.

The instant invention is applicable to the formation of any article wherein the ratio of the maximum outside diameter of the body portion to the outside diameter of the thread and/or neck area is relatively large, preferably greater than about 3:1, more preferably within the range of 4:1 to 20:1. Specifically, the neck area can be reduced in diameter in an amount up to 50 percent or more, preferably 20–40 percent.

The reduced neck area can have a wall thickness which is the same as, less than, or more than the initial parison. Generally, the final wall thickness will be about the same or within the range of 10–50 percent less than the initial wall thickness. The compression ratio, that is, the ratio of volume of plastic in the neck area before the compression-forming operation to the volume after the operation can be within the range of 1.2:1 to 5:1, preferably 2:1 to 3:1.

While the stretching, insertion of the plug, and expansion into conformity with the mold is generally carried out at ambient temperature, the sequence of steps is sufficiently rapid that the polymer remains at orientation temperature throughout the operation so as to achieve molecular orientation.

The plug can be made of any suitable material such as Teflon, steel, or the like. A preferred material is Stellite. The collet can be made of any structurally suitable material. Steel is the preferred material since it has the necessary hardness and can be fabricated so that alternate jaws flex inward and outward.

Referring now to the FIGURES, particularly FIG. 1, there is shown an extruder 10 for forming tubular extrudate 12. The tubular extrudate passes through vacuum cooling and sizing chamber 14 and thence through cutting means 16 where it is severed into individual work pieces 18. Individual work pieces 18 pass through oven 20 where they are heated to orientation temperature. The parisons are then transferred by means not shown to thread-forming head 22 comprising collet 24, plug 26, and sleeve 28. After the threads have been formed, mold halves 30 close and the parison is expanded out into conformity therewith by means of internal fluid pressure introduced via line 32.

Referring now to FIG. 2, there is shown the thread-forming head 22 in greater detail, Centrally disposed within thread-forming head 22 is axially movable plug 26. Plug 26 is concentrically disposed with collet 24. Collet 24 is stationary relative to the rest of the thread-forming head. With the collet in its natural open position, as shown in FIG. 4, an end of a parison is inserted over plug 26 and thus within collet 24.

Referring now to FIG. 4, there is shown in schematic representation the end of collet 24. As can be seen, this collet is comprised of a first plurality of jaws 34 which are biased radially outwardly. Alternately spaced between said first plurality of jaws 34 is a second plurality of jaws 36. The jaws 36 are biased inwardly so that without any other restraining influence, jaws 34 flex outwardly and jaws 36 inwardly with surfaces 38 of jaws 34 being parallel to, and in contact with, surfaces 40 of jaws 36. Opposite sides 38 of jaws 34 can be seen to diverge in a direction towards the center whereas surfaces 40 of jaws 36 converge toward the center; that is, these jaws are wedge-shaped or of the general shape of a truncated rectangular pyramid or tenon, with the inner thread-forming area 42 of jaws 34 being wider than the outer peripheral portion 44. Since surfaces 40 and 38 are parallel, and since surfaces 38 flare outwardly at the inward extension thereof, there is no gap between edge 45 of leading surface 42 and surface 40 at any time during the closing of the collet. Thus, as jaws 34 and 36 move inwardly compressing the parison as shown in FIGS. 5 and 6, there is no flash between successive jaw members. In other words, viewing the jaws as truncated rectangular pyramids they are disposed with alternate members having their base portions inward and the others having their base portions outward.

While jaw members 36 are shown as generally truncated rectangular pyramids with their base portions outward, they could be so contoured that their inward surface 47 was pointed, as could be outer portion 44 of jaw members 34.

The jaw members are described as having a generally truncated rectangular pyramid shape; by this is meant that they are not exactly true pyramids since the base and truncated ends are curved slightly. Also, they could be tapered slightly in the direction away from the end thereof.

The collet is caused to close by the forward axial movement of sleeve 28 (FIG. 2) which presses members 34 radially inward. Since members 36 are biased inward, the surfaces 40 are kept in intimate contact with surfaces 38 throughout this operation.

Figure 3:
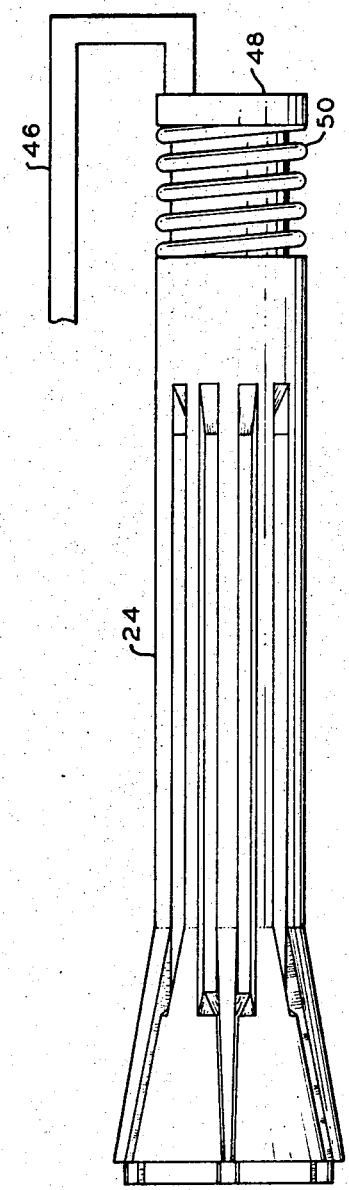
FIG. 3 is a view of the mechanism for actuating an internal plug.

FIG. 3 shows the arrangement by which plug 26 is moved. As sleeve 28 moves forward closing the collet, member 46, which is attached thereto by means not shown, causes shaft 48 which is an elongated extension of plug 26 to move axially forward along with the sleeve. This presses the plug firmly into the center of the parison, and forms a backup member against which the parison is compressed. On retraction of the sleeve, plug 26 is caused to retract by means of spring 50. This allows the collet to open to the position shown in FIG. 4. If desired, the rear portion of the plug can be beveled and disposed so as to contact jaw members 36 and physically force them to open up.

Referring back to FIG. 4, there is shown a projection of the side surfaces 38 of member 34 which form an angle A having an arc of 20°. It is apparent that an extension of parallel surfaces 40 of successive members 36 would form the same angle. This angle can vary greatly, depending on the particular requirements of a specific apparatus. Theoretically, the lower limit for a value for this angle would be a finite number just above 0, since at 0, opposing surfaces 38 of an individual member 34 would be parallel and thus, as the collet began to open, a crack would form as members 34 and 36 move radially out. As a practical matter, the value for this angle must be considerably above 1° in order to provide a reasonable amount of increase in diameter of the inner portion of the collet without excessive radial movement of the members 34. The theoretical maximum for angle A would be just below 180°. As a practical matter, however, the value for this angle would have to be much less than this because of the structural weakness of members having angles anywhere approaching 180°. Generally this angle will be in the range of 5°–90°, preferably 10°–40°.

The number of members 34 and 36 can vary widely so long as an even number of each is provided and a plurality of each is provided. The collet shown in the drawings having six of each set of jaws represents a particularly suitable number.

Many conventional parts such as heaters, temperature controllers, frame elements, cylinders, and the like have been omitted from the drawings for the sake of simplicity, but their inclusion is understood by those skilled in the art and is within the scope of the invention.

EXAMPLE

Propylene homopolymer having a density of 0.905 (ASTM D 1505–63T), a melt flow of 3.5 (ASTM D 1238–62T, Condition L), and a melting point of about 340° F. was extruded into tubing having an external diameter of 24 millimeters and a wall thickness of 4 millimeters. The tubing was cooled to room temperature and cut into 7-inch lengths. These 7-inch lengths were heated to a temperature of 320°–327° F. and an open end thereof compressed into a threaded neck finish area having an external diameter of 20 millimeters and an internal diameter of 15 millimeters with a collet having alternate jaws flared at an inward extension thereof as shown in the drawings. No flash was formed between the jaws even though the polymer was at a temperature well below normal fabrication temperature.

A similar operation was carried out, reducing the diameter of a parison from 33 to 24 millimeters.

While this invention has been described in detail for the purpose of illustration, it is not to be construed as limited thereby, but is intended to cover all changes and modifications within the spirit and scope thereof.

I claim:
1. Apparatus comprising in combination:
   a collet having at one end a first plurality of jaws flaring toward the inward portion thereof;
   a second plurality of jaws spaced one between each of said first plurality of jaws, said first plurality of jaws being biased radially outward and said second plurality of jaws being biased radially inward such that without any restraining influence said collet is in an expanded position with inner forming surfaces of said first plurality of jaws being disposed radially outward from inner forming surfaces of said second plurality of jaws;
   means comprising a sleeve around said collet which, on axial movement toward said end of said collet having said jaws, exerts pressure radially inward on said first plurality of jaws to close said jaws to form a circle, facing surfaces of said first and second jaws being parallel and in sliding contact during all of said closing operation; and
   an internal plug disposed so as to provide an annulus between an outer forming surface of said plug and said inner forming surfaces of said jaws when said jaws are closed.
2. Apparatus according to claim 1 wherein said forming surfaces are in the form of thread-forming means.
3. Apparatus according to claim 1 wherein the angle between opposite faces of said jaws of said first plurality of jaws is within the range of 10°–40°.
4. Apparatus according to claim 1 comprising in addition means to move said plug axially forward along with said forward movement of said sleeve.
5. Apparatus according to claim 1 comprising in addition two mold halves; means to open and close said mold halves; and means to introduce fluid pressure into a parison held by said jaws.
6. Apparatus according to claim 5 comprising in addition: means to heat a parison preform to orientation temperature.

7. Apparatus according to claim 6 comprising in addition: means to extrude a continuous length of tubing; means to cool said tubing to a temperature below the melting point thereof; and means to sever said tubing into said individual parisons.

8. Apparatus according to claim 7 wherein said means to heat said parison comprises an air oven.

* * * * *